United States Patent
Kamiya et al.

(10) Patent No.: US 9,739,327 B2
(45) Date of Patent: Aug. 22, 2017

(54) CUSHION CLIP

(71) Applicant: DAIWA KASEI KOGYO KABUSHIKI KAISHA, Okazaki-shi, Aichi-ken (JP)

(72) Inventors: Haruhisa Kamiya, Anjo (JP); Toshio Iwahara, Okazaki (JP); Keiji Okaichi, Okazaki (JP); Takeo Horiuchi, Okazaki (JP)

(73) Assignee: DAIWA KASEI KOGYO KABUSHIKI KAISHA, Aichi-Ken (JP)

( * ) Notice: Subject to any disclaimer, the term of this patent is extended or adjusted under 35 U.S.C. 154(b) by 161 days.

(21) Appl. No.: 14/152,709

(22) Filed: Jan. 10, 2014

(65) Prior Publication Data
US 2014/0196261 A1    Jul. 17, 2014

(30) Foreign Application Priority Data
Jan. 15, 2013  (JP) .................. 2013-004498

(51) Int. Cl.
*F16F 1/377*  (2006.01)
*E05F 5/02*   (2006.01)

(52) U.S. Cl.
CPC .............. *F16F 1/377* (2013.01); *E05F 5/022* (2013.01); *B60G 2202/143* (2013.01); *Y10T 24/45225* (2015.01)

(58) Field of Classification Search
CPC ..... F16F 1/377; E05F 5/022; Y10T 24/45225; B60G 2202/143
See application file for complete search history.

(56) References Cited

U.S. PATENT DOCUMENTS 6,857,166 B2 *  2/2005  Nakagaki ............... E05F 5/022
                                                  16/86 R
7,566,081 B2 *  7/2009  Aoyama ................. E05F 5/022
                                                  293/104
(Continued)

FOREIGN PATENT DOCUMENTS

JP    S39-018651 Y      7/1964
JP    2010001967 A  *   1/2010
(Continued)

OTHER PUBLICATIONS

Japanese Office Action of JP 2013-004498 dated Jul. 12, 2016 along with its English Translation.

*Primary Examiner* — Robert J Sandy
*Assistant Examiner* — Louis Mercado
(74) *Attorney, Agent, or Firm* — Christensen, Fonder, Dardi & Herbert PLLC

(57) ABSTRACT

A cushion clip may include an engagement leg that is capable of being attached to either one of a fixed member or a movable member moving toward and away from the fixed member; and a cushion that is capable of being elastically deformed by a load applied from the movable member moving toward the fixed member, thereby absorbing impact caused by movement of the movable member. The cushion has a hollow barrel shape such that an intermediate portion positioned between a bottom portion connected to the engagement leg and a top portion positioned opposite to the bottom portion is circumferentially expanded to a maximum circumference.

2 Claims, 5 Drawing Sheets

(56) References Cited

U.S. PATENT DOCUMENTS

| | | | | |
|---|---|---|---|---|
| 8,291,547 | B2* | 10/2012 | Ukai | F16B 21/086 16/86 R |
| 8,407,857 | B2* | 4/2013 | Sugiyama | F16F 1/371 16/86 R |
| 8,677,563 | B2* | 3/2014 | Diep | E05F 5/08 16/82 |
| 2003/0088940 | A1* | 5/2003 | Nakagaki | E05F 5/022 16/86 R |
| 2007/0234527 | A1* | 10/2007 | Aoyama | E05F 5/022 24/297 |
| 2010/0192335 | A1* | 8/2010 | Ukai | F16F 1/373 24/591.1 |
| 2011/0030177 | A1* | 2/2011 | Ukai | F16B 21/086 24/458 |
| 2011/0283490 | A1* | 11/2011 | Sugiyama | F16F 1/371 24/457 |
| 2012/0246896 | A1* | 10/2012 | Kaji | E05F 5/022 24/682.1 |
| 2015/0121665 | A1* | 5/2015 | Kaji | F16B 21/086 24/458 |
| 2015/0240907 | A1* | 8/2015 | Seko | F16F 15/08 267/141 |

FOREIGN PATENT DOCUMENTS

| | | |
|---|---|---|
| JP | 2010-164171 A | 7/2010 |
| JP | 2011064292 | 3/2011 |

* cited by examiner

CUSHION CLIP

BACKGROUND OF THE INVENTION

Field of the Invention

The present invention relates to a cushion clip. More particularly, the present invention relates to a cushion clip that can be compressed and absorb impact when a glove box door (a movable member) of an automobile is closed. The glove box door is preferably be attached to an instrument panel (a fixed member) of the automobile and can be closed and opened.

Description of Related Art

A known cushion clip of this type is taught by, for example, JP2010-164171A. The cushion clip includes an engagement leg that can be connected to a fixed member by inserting it into an attaching hole formed in the fixed member, and a cushion that can contact a movable member and elastically deform. The cushion has a hollow truncated cone (frustoconical) shape and is tapered (reduced in diameter) from a base portion connected to the engagement leg toward a top portion positioned opposite to the base portion. Further, the cushion has a wall thickness that gradually becomes smaller starting at the base portion and going towards the top portion.

In the cushion clip taught by JP2010-164171A, when the cushion is compressed by a load applied from the movable member, compression strain can be formed in the cushion. At this time, a portion adjacent to the top portion having a relatively thin wall thickness can be excessively deformed, so that concentration of stress can be generated in the portion of the cushion. When the concentration of stress is generated in the cushion, the cushion may have a reduced restoration capability with regard to the compression strain. Therefore, the cushion cannot retain a required elastic repulsive force. As a result, when the cushion clip is used in a glove box door (a movable member) of an automobile, the grove box door may produce rattling when it is closed. Thus, there is a need in the art for an improved cushion clip.

BRIEF SUMMARY OF THE INVENTION

For example, one aspect of the present invention may provide a cushion clip that may include an engagement leg. This engagement leg may be attached to either one of a fixed member or a movable member moving towards and away from the fixed member. The cushion clip may also include a cushion that is capable of being elastically deformed by a load applied from the movable member moving towards the fixed member. In this way, the cushion can absorb impact caused by movement of the movable member. The cushion has a hollow barrel shape such that an intermediate portion positioned between a bottom portion connected to the engagement leg and a top portion positioned opposite to the bottom portion is circumferentially expanded to a maximum circumference.

According to one aspect of the invention, the cushion having the hollow barrel shape can be compressed and elastically deformed in a compressing direction when a load is applied the cushion from the movable member. During such compression, the entire cushion can be uniformly deformed while the intermediate portion is circumferentially expanded. In this way, compression strain can be formed in the cushion. However, concentration of stress cannot be generated in the cushion. Therefore, the cushion may have sufficient restoration capability with regard to the compression strain. Thus, the cushion can retain a required elastic repulsive force. As a result, when the cushion clip is used in a glove box door (the movable member) of an automobile, the glove box door may be prevented from producing rattling in a state where it is closed. This may prevent the production of noise in a cabin of the automobile.

Optionally, the cushion may be shaped such that the intermediate portion circumferentially expanded to maximum circumference has a maximum wall thickness. Further, the cushion may be shaped such that the bottom portion has a minimum wall thickness.

According to one aspect of the invention, when the cushion is compressed by the load applied from the movable member, portions close to the bottom portion and the top portion can be deformed before the intermediate portion. Thereafter, the intermediate portion can be deformed while it is circumferentially expanded, so that the entire cushion can be uniformly deformed.

Further, because the bottom portion has the minimum wall thickness, the bottom portion can be easily deformed although the bottom portion is connected to and constrained by the engagement leg. Thus, the whole cushion can be uniformly deformed.

Other objects, features and advantages of the present invention will be readily understood after reading the following detailed description together with the accompanying drawings and the claims.

DETAILED DESCRIPTION OF THE INVENTION

Next, a representative embodiment of the present invention will be described with reference to FIGS. 1 to 9.

Figure 1:
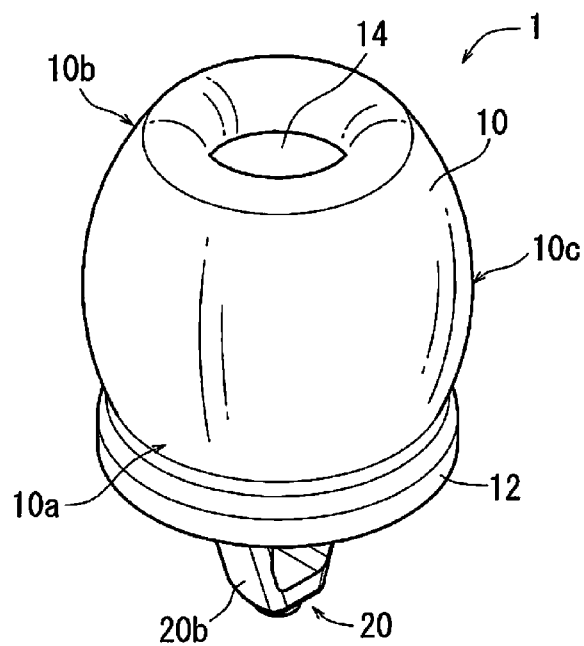
FIG. 1 is a perspective view of a cushion clip according to a representative embodiment of the present invention.

A representative cushion clip 1 shown therein may be configured to be compressed and absorb impact when a glove box door 34 (a movable member) attached to an instrument panel 30 (a fixed member) of an automobile (not shown) is closed. As shown in FIG. 1, the cushion clip 1 may include a cushion 10 made of a soft material such as a thermoplastic elastomer (e.g., TPE), and an engagement leg 20 made of a hard material such as polypropylene (PP).

Figure 2:
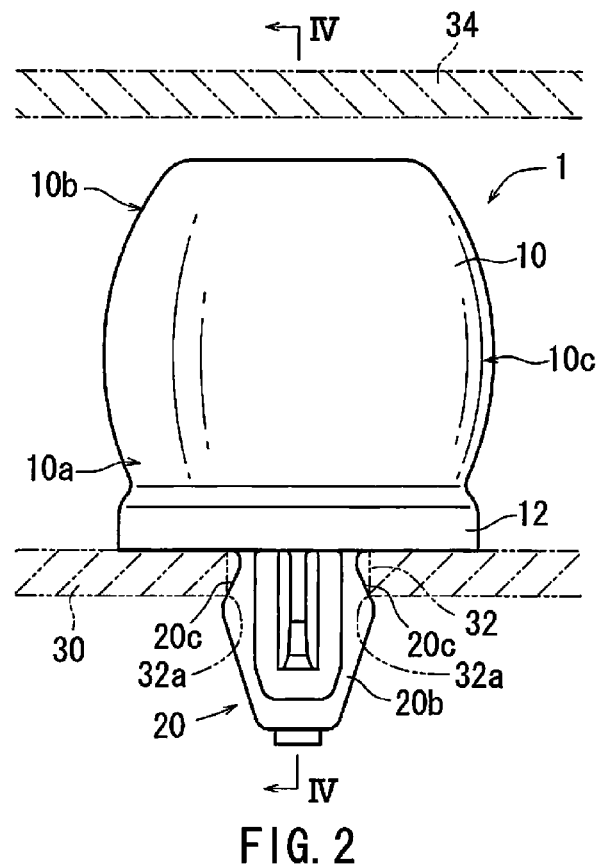
FIG. 2 is an elevational view of the cushion clip, in which a fixed member and a movable member are respectively shown by chain double-dashed lines.
Figure 4:
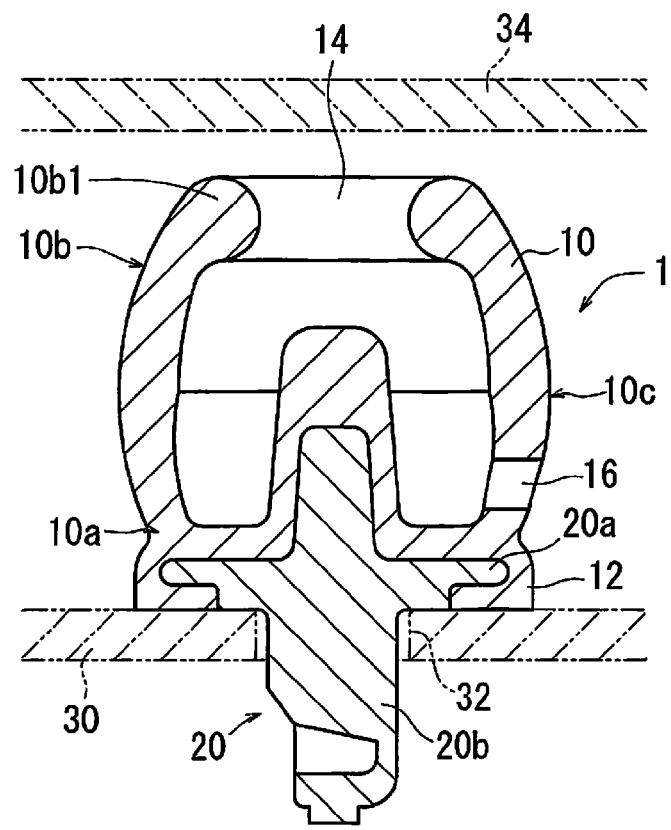
FIG. 4 is a cross-sectional view taken along line IV-IV in FIG. 2.

As shown in FIGS. 2 and 4, in this embodiment, the engagement leg 20 is inserted into an attachment hole 32 formed in the instrument panel 30, so that cushion clip 1 can be attached to the instrument panel 30. The cushion 10 of the cushion clip 1 attached to the instrument panel 30 can contact the glove box door 34 as the glove box door 34 moves toward the instrument panel 30 when the glove box door 34 is closed. In this way, it can be compressed and elastically deformed in a compressing direction. Thus, the impact caused by movement of the glove box door 34 can be dampened or absorbed.

As shown in FIGS. 1, 2 and 4, the cushion 10 may generally have a hollow (bottomed) barrel shape. That is, as shown in FIG. 4, the cushion 10 may have an outwardly-bulged arcuate shape in its vertical cross-section. In particular, the cushion 10 may have a bottom portion 10a, a top portion 10b and an intermediate portion 10c. The intermediate portion 10c may be circumferentially expanded to a maximum circumference, so as to have a maximum diameter which is greater than the bottom portion 10a and the top portion 10b. Further, the bottom portion 10a and the top portion 10b may have substantially the same diameter as each other.

Figure 3:
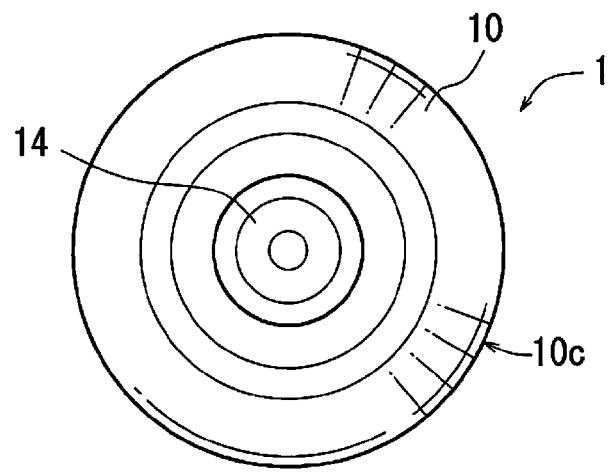
FIG. 3 is a plan view of the cushion clip.

As shown in FIGS. 3 and 4, the cushion 10 may have a circular upper opening 14 that is formed in a central portion of the top portion 10b. In particular, the cushion 10 may have an annular top peripheral portion 10b1 formed in the top portion 10b, so that the opening 14 can be formed therein. The cushion 10 may also have an air vent port 16 that is formed in the bottom portion 10a in order to provide communication between the inside and the outside of the cushion 10. Further, the cushion 10 may have a base portion 12 integrally formed in the bottom portion 10a. The cushion 10 may be integrally connected to the engagement leg 20 via the base portion 12.

As described above, because the cushion 10 may have a hollow barrel shape, when the cushion 10 is compressed by the glove box door 34, the entire cushion 10 can be uniformly deformed while the intermediate portion 10c can be circumferentially expanded. As a result, concentration of stress in a portion of the cushion 10 can be prevented. This may prevent formation of compression strain in the cushion 10.

As described above, because the cushion 10 can be uniformly deformed due to the hollow barrel shape, the cushion 10 may have a uniform wall thickness over the entire length thereof (from the bottom portion 10a to the top portion 10b). However, in this embodiment, the cushion 10 may be at its thickest in the intermediate portion 10c such that the cushion 10 can be more uniformly compressed and deformed. Such a configuration will be described hereinafter in detail.

Further, as shown in FIG. 4, the top peripheral portion 10b1 of the cushion 10 may preferably be thickened in order to increase stiffness or rigidity thereof. Therefore, even when the cushion is compressed and deformed, a constant diameter of the opening 14 can be substantially maintained. Further, an end face of the top peripheral portion 10b1 may preferably have a semicircular cross-sectional shape.

Conversely, as shown in FIG. 4, the engagement leg 20 may have a disk-shaped base portion 20a and an engagement portion 20b projecting from the base portion 20a. The base portion 20a may be embedded (received) in the base portion 12 of the cushion 10, so that the engagement leg 20 can be integrated with the cushion 10. Conversely, as shown in FIG. 2, the engagement portion 20b may preferably have a ship bottom-shape (a substantially cross-sectional U-shape). In particular, the engagement portion 20b may have a pair of outwardly bulging flexible portions. Further, the cushion 10 and the engagement leg 20 may preferably be integrally formed by a two-color molding of the soft material (e.g., TPE) and the hard material (e.g., PP).

As shown in FIG. 2, when the engagement portion 20b of the engagement leg 20 is pressed into the attachment hole 32 formed in the instrument panel 30, the engagement portion 20b can be inserted into the attachment hole 32 while the flexible portions formed in the engagement portion 20b may be flexed inwardly. As a result, engagement surfaces (shouldered portions) 20c formed in the flexible portions of the engagement portion 20b may engage an inner periphery 32a of the attachment hole 32, so that the engagement leg 20 can be secured to the instrument panel 30. Thus, the cushion clip 1 can be attached to the instrument panel 30.

Figure 5:
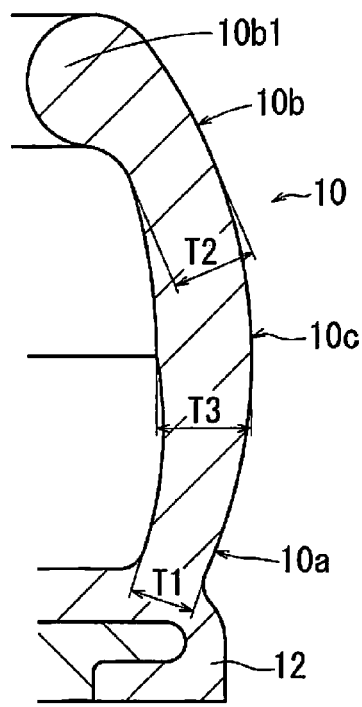
FIG. 5 is a partially enlarged longitudinal cross-sectional view of the cushion clip, in which a cushion of the cushion clip is partially enlarged.

As described above, in this embodiment, the cushion 10 may be at its thickest in the intermediate portion 10c with the exception of the top annular peripheral portion 10b1. As shown in FIG. 5, the intermediate portion 10c may have a wall thickness T3 that is greater than a wall thickness T1 of the bottom portion 10a and a wall thickness T2 of the top portion 10b. That is, the cushion 10 may be shaped such that the wall thickness T3 may represent a maximum wall thickness. In particular, the cushion 10 may be reduced in thickness from the intermediate portion 10c toward the bottom portion 10a and the top portion 10b.

Further, the wall thickness T1 of the bottom portion 10a may be substantially the same as or smaller than the wall thickness T2 of the top portion 10b. However, in this embodiment, the cushion 10 may be shaped such that the wall thickness T1 may represent a minimum wall thickness. In particular, as will be apparent from FIG. 5, the cushion 10 may be largely reduced in thickness from the intermediate portion 10c toward the bottom portion 10a such that the bottom portion 10a may be thinner than the top portion 10b. Thus, the cushion 10 may be shaped such that the wall thickness T1 of the bottom portion 10a is smaller than the wall thickness T2 of the top portion 10b.

Figure 6:
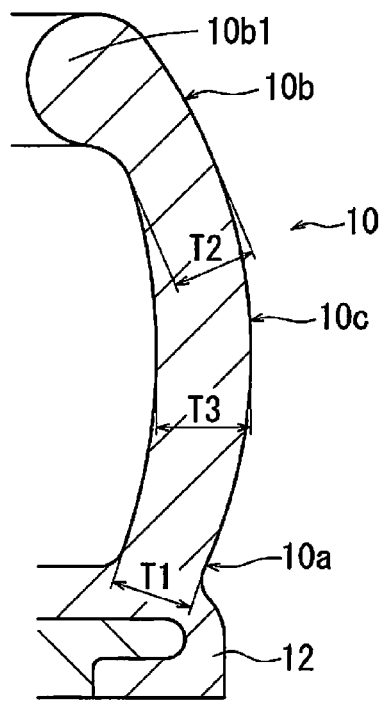
FIG. 6 is a partially enlarged longitudinal cross-sectional view similar to FIG. 5, which view illustrates a modified form of the cushion clip.

Further, the thickness of the cushion 10 may be modified. For example, as shown in FIG. 6, the cushion 10 may be shaped so as to have an arcuate depressed portion between the intermediate portion 10c and the bottom portion 10a. In such a modified form, the cushion 10 may be at its thinnest between the intermediate portion 10c and the bottom portion 10a. That is, in the modified form, the cushion 10 may be shaped such that a portion between the intermediate portion 10c and the bottom portion 10a may have a wall thickness at its minimum According to the cushion clip 1 thus constructed, when the glove box door 34 is closed and is pressed against the cushion clip 1 attached to the instrument panel 30, the cushion 10 of the cushion clip 1 can be compressed and elastically deformed in the compressing direction by a load applied from the glove box door 34. Thus, the impact caused by the movement of the glove box door 34 can be absorbed. Further, when the cushion 10 is compressed, the opening 14 formed in the top portion 10b of the cushion 10 may be closed by the glove box door 34. However, even if the opening 14 is closed by the glove box door 34 when the cushion 10 is compressed, air contained in an interior of the cushion 10 can be discharged via the air vent port 16 formed in the bottom portion 10a of the cushion 10. Therefore, the cushion 10 can be constantly and smoothly compressed.

Figure 7:
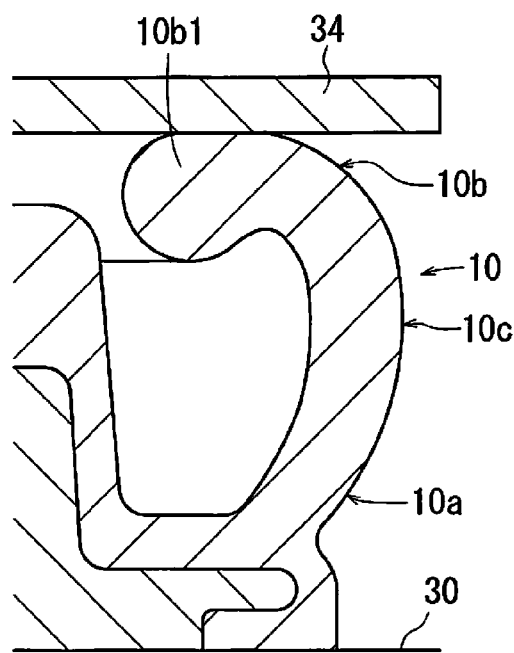
FIG. 7 is a partially enlarged longitudinal cross-sectional view of the cushion clip, which view illustrates an initial stage when the cushion clip is compressed and deformed.
Figure 8:
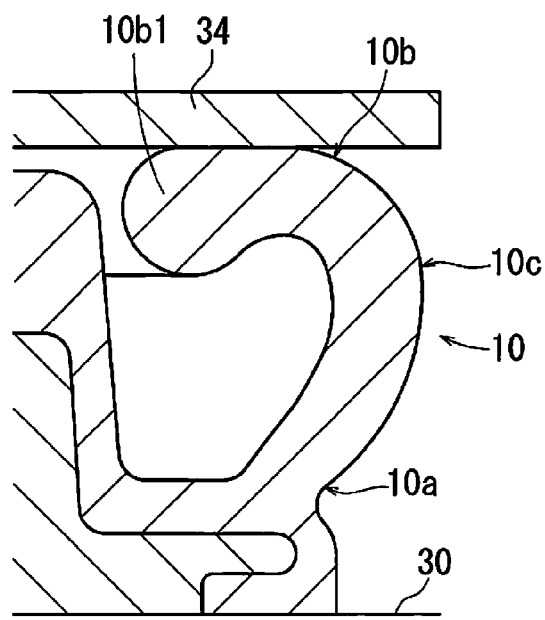
FIG. 8 is a partially enlarged longitudinal cross-sectional view of the cushion clip, which view illustrates an intermediate stage when the cushion clip is compressed and deformed.
Figure 9:
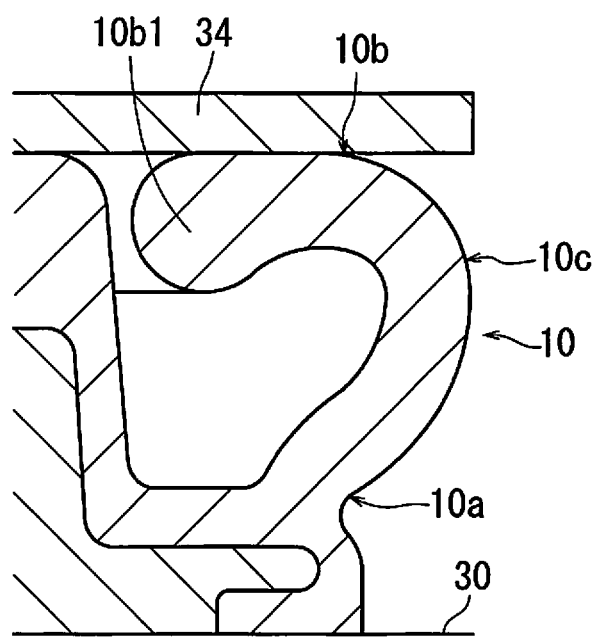
FIG. 9 is a partially enlarged longitudinal cross-sectional view of the cushion clip, which view illustrates a final stage when the cushion clip is compressed and deformed.

Next, an operation of the cushion clip 1 thus constructed will now be described in detail with reference to FIGS. 7 to 9.

As previously described, the cushion 10 may have the hollow barrel shape in which the intermediate portion 10c is circumferentially expanded to its maximum. Further, the intermediate portion 10c may be the thickest part of the cushion 10. That is, the cushion 10 may be shaped such that the wall thickness T3 may represent a maximum wall thickness which is greater than the wall thickness T1 and the wall thickness T2. Therefore, as shown in FIG. 7, when the cushion 10 is compressed by the load applied from the glove box door 34, a portion close to the bottom portion 10a and a portion close to the top portion 10b can be deformed before the intermediate portion 10c. Thereafter, as shown in FIG. 8, when the cushion 10 is further compressed, the intermediate portion 10c can be deformed while it is circumferentially expanded. Finally, as shown in FIG. 9, when the cushion 10 is further compressed, the whole cushion 10 can be uniformly deformed. Thus, concentration of stress in a portion of the cushion 10 can be prevented. This may prevent formation of compression strain in the cushion 10.

Generally, the bottom portion 10a of the cushion 10 cannot be easily deformed because the bottom portion 10a is constrained by the base portion 12 to which the base portion 20a of the engagement leg 20 is connected. However, in this embodiment, the bottom portion 10a can be easily deformed because the bottom portion 10a may have a minimum wall thickness (the wall thickness T1). Therefore, the cushion 10 can be uniformly deformed as a whole.

Naturally, various changes and modifications may be made to the present invention without departing from the scope of the invention. For example, in the embodiment, the cushion 10 and the engagement leg 20 are integrally formed by the two-color molding of the two different materials. However, the cushion 10 and the engagement leg 20 can be separately formed and connected to each other by using adhesive. Further, the cushion 10 and the engagement leg 20 can be integrally formed by single-color molding of a single material as required. As will be recognized, in this case, an elastic material may be used as the single material such that the cushion 10 may have a desired elasticity.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A cushion clip comprising:
   an engagement leg; and
   a hollow barrel-shaped cushion,
   wherein the cushion has a bottom portion connected to the engagement leg, a top portion positioned opposite to the bottom portion, and an intermediate portion positioned between the bottom portion and the top portion, and
   wherein the intermediate portion is circumferentially expanded to a maximum circumference of the cushion and defines a maximum wall thickness of the cushion,
   wherein the bottom portion defines a minimum wall thickness of the cushion, and
   wherein the cushion has an arcuate depressed portion extending from the intermediate portion to the bottom portion, so that the bottom portion is reduced in thickness to the minimum thickness of the cushion.

2. The cushion clip as defined in claim 1, wherein the cushion has an additional arcuate depressed portion extending from the intermediate portion to the top portion over an entire area thereof, so that the top portion is reduced in thickness to have a wall thickness equal to or greater than the bottom portion.

* * * * *